United States Patent
Jeong

(10) Patent No.: US 9,335,881 B2
(45) Date of Patent: May 10, 2016

(54) TOUCH SCREEN PANEL

(71) Applicant: SAMSUNG DISPLAY CO., LTD., Yongin, Gyeonggi-do (KR)

(72) Inventor: Hwan-Hee Jeong, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 129 days.

(21) Appl. No.: 13/954,827

(22) Filed: Jul. 30, 2013

(65) Prior Publication Data

US 2014/0028599 A1    Jan. 30, 2014

(30) Foreign Application Priority Data

Jul. 30, 2012 (KR) .................... 10-2012-0083226

(51) Int. Cl.
G06F 3/041 (2006.01)
G06F 3/047 (2006.01)
G06F 3/044 (2006.01)

(52) U.S. Cl.
CPC ................ *G06F 3/047* (2013.01); *G06F 3/044* (2013.01); *G06F 3/0412* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 2008/0309623 A1* | 12/2008 | Hotelling | C12N 15/86 345/173 |
| 2009/0085891 A1* | 4/2009 | Yang | G06F 3/044 345/174 |
| 2010/0007616 A1* | 1/2010 | Jang | 345/173 |
| 2010/0085326 A1* | 4/2010 | Anno | G06F 3/044 345/174 |
| 2010/0163394 A1* | 7/2010 | Tang | G06F 3/0416 200/600 |
| 2010/0182275 A1* | 7/2010 | Saitou | 345/174 |
| 2011/0048813 A1* | 3/2011 | Yilmaz | G06F 3/044 178/18.06 |
| 2011/0134056 A1* | 6/2011 | Kim | G06F 3/0412 345/173 |
| 2011/0316803 A1 | 12/2011 | Kim | |
| 2012/0044191 A1* | 2/2012 | Shin | 345/174 |
| 2012/0306776 A1 | 12/2012 | Kim et al. | |
| 2013/0106747 A1* | 5/2013 | Choi | G06F 3/041 345/173 |
| 2014/0184952 A1* | 7/2014 | Chu | G06F 3/044 349/12 |

FOREIGN PATENT DOCUMENTS

| | | |
|---|---|---|
| KR | 10-2005-0046144 A | 5/2005 |
| KR | 10-2012-0001406 A | 1/2012 |
| KR | 10-2012-0012005 A | 2/2012 |
| KR | 10-2012-0133849 | 12/2012 |

* cited by examiner

*Primary Examiner* — Dismery Mercedes

(74) *Attorney, Agent, or Firm* — Lewis Roca Rothgerber Christie LLP

(57) ABSTRACT

Disclosed here is a touch screen panel capable of implementing a double routing structure without increasing the number of pads of a pad part by implementing some sensing lines of first and second sensing lines that are electrically coupled to first and second sensing cells arranged on a display region, in the double routing structure, and electrically coupling the sensing lines implemented in the double routing structure to the pads of the pad part through connection patterns.

14 Claims, 4 Drawing Sheets

TOUCH SCREEN PANEL

CROSS-REFERENCE TO RELATED APPLICATION

This application claims priority to and the benefit of Korean Patent Application No. 10-2012-0083226, filed on Jul. 30, 2012, in the Korean Intellectual Property Office, the entire content of which is incorporated herein by reference.

BACKGROUND

1. Field

Embodiments of the present invention relate to a touch screen panel, and more particularly, to a touch screen panel in which a routing structure of a sensing line is improved.

2. Description of the Related Art

A touch screen panel is an input device capable of inputting a user's instruction by selecting instruction contents displayed on a screen of an image display device, or the like, with a human hand or an object.

To this end, the touch screen panel is provided on a front surface of the image display device to convert a contact position that is directly contacted by the human hand or the object into an electric signal. Therefore, an instruction content selected at the contact position is recognized as an input signal.

Since the touch screen panel as described above may replace a separate input device operated by being connected to the image display device, such as a keyboard and a mouse, the application of the touch screen panel has gradually increased.

As a scheme of implementing the touch screen panel, there are a resistive type scheme, an optical sensing type scheme, a capacitive type scheme, and the like.

FIG. 1 is a plan view showing a touch screen panel according to the related art.

Referring to FIG. 1, the touch screen panel according to the related art is configured to include a transparent substrate 1, sensing patterns 22 formed on a display region of the transparent substrate 1, and sensing lines 23 formed on a non-display region positioned outside of the display region and connecting the sensing patterns 22 to an external driving circuit (not shown) through a pad part 25.

The sensing lines 23 include first sensing lines 23a each connected to first sensing cells 22a arranged in a first direction (for example, an X axis direction) among the sensing patterns 22, and second sensing lines 23b each connected to second sensing cells 22b arranged in a second direction (for example, a Y axis direction) among the sensing patterns 22.

The touch screen panel according to the related art is implemented in a structure in which the first and second sensing lines (23a and 23b) are each connected to the corresponding first and second sensing cells (22a and 22b) positioned at a distal end of one side of the display region, as shown in FIG. 1, that is, a single routing structure.

That is, referring to FIG. 1, the first sensing lines 23a are connected to the first sensing cells 22a positioned at a distal end of the left portion of the display region to thereby be connected to a plurality of pads 25a provided in the pad part 25, and the second sensing lines 23b are connected to the second sensing cells 23b positioned at a distal end of a lower portion of the display region to thereby be connected to the pads 25a of the pad part 25.

As the size of a touch screen panel is enlarged, the number of sensing cells provided in the display region is correspondingly increased. If the sensing lines are connected to each of the sensing cells in the single routing structure, touch sensing sensitivity may be deteriorated.

As an example, the second sensing cells 22b positioned at a region A shown in FIG. 1 are positioned to be adjacent to the second sensing lines 23b connected thereto to have high sensing sensitivity. However, the second sensing cells 22b positioned at a region B shown in FIG. 1 are positioned to be relatively distant from the second sensing lines 23b connected thereto to have low sensing sensitivity.

SUMMARY

Embodiments of the present invention provide a touch screen panel capable of implementing a double routing structure without increasing the number of pads of a pad part by implementing some sensing lines of first and second sensing lines each electrically coupled to first and second sensing lines arranged on a display region, in the double routing structure and electrically coupling the sensing lines implemented in the double routing structure to the pads of the pad part through connection patterns.

According to an exemplary embodiment of the present invention, there is provided a touch screen panel including: sensing patterns formed on a display region of a transparent substrate and including first sensing cells arranged in a first direction and second sensing cells arranged in a second direction so as not to be overlapped with the first sensing cells; first and second sensing lines formed in a non-display region of the transparent substrate outside of the display region, each of the first sensing lines being coupled to the corresponding first sensing cells and each of the second sensing lines being coupled to the corresponding second sensing cells; and a pad part including a plurality of pads coupled to the first and second sensing lines, respectively; wherein the first and/or second sensing lines are implemented in a double routing structure, and the sensing lines implemented in the double routing structure are electrically coupled to the pads of the pad part through connection patterns.

Each of the sensing lines implemented in the double routing structure may be coupled to the corresponding sensing cells arranged in the same column in the first direction or the same row in the second direction at two distal ends of the display region.

The second sensing lines may be implemented in the double routing structure.

Each of the second sensing lines coupled to sensing cells positioned at two distal ends of the display region among the second sensing cells arranged in the same row in the second direction, may form a closed loop with the sensing cells.

The first and second sensing cells may include a transparent conductive material, and the first and second sensing lines may include a metal material having low resistance.

The connection patterns may be formed on a layer different from a layer on which the first and second sensing lines are formed.

The connection patterns may include the same material as that of the first and second sensing cells. In this case, one side of the connection patterns may be positioned on an insulation layer formed on the second sensing lines, and the connection patterns may be electrically coupled to the second sensing lines through contact holes formed in the insulation layer at a region overlapped with the second sensing lines corresponding thereto.

Another side of the connection patterns may be positioned on the insulation layer formed on the pads, and the connection patterns may be electrically coupled to the pads through contact holes formed in the insulation layer of a region overlapped with the pads corresponding thereto. The connection patterns may be integrally formed with the plurality of pads of the pad part. In this case, one side of the connection patterns may be positioned on the insulation layer formed on the first and second sensing lines, and the connection patterns are electrically coupled to the first and second sensing lines through contact holes formed in the insulation layer of a region overlapped with the first and second sensing lines corresponding thereto, respectively.

In addition, the sensing patterns further include: first connection lines, each of the first connection lines coupling the first sensing cells adjacent to each other in the first direction to each other; and second connection lines, each of the second connection lines coupling the second sensing cells adjacent to each other in the second direction.

An insulation layer is interposed at a crossing portion between the first and second connection lines.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
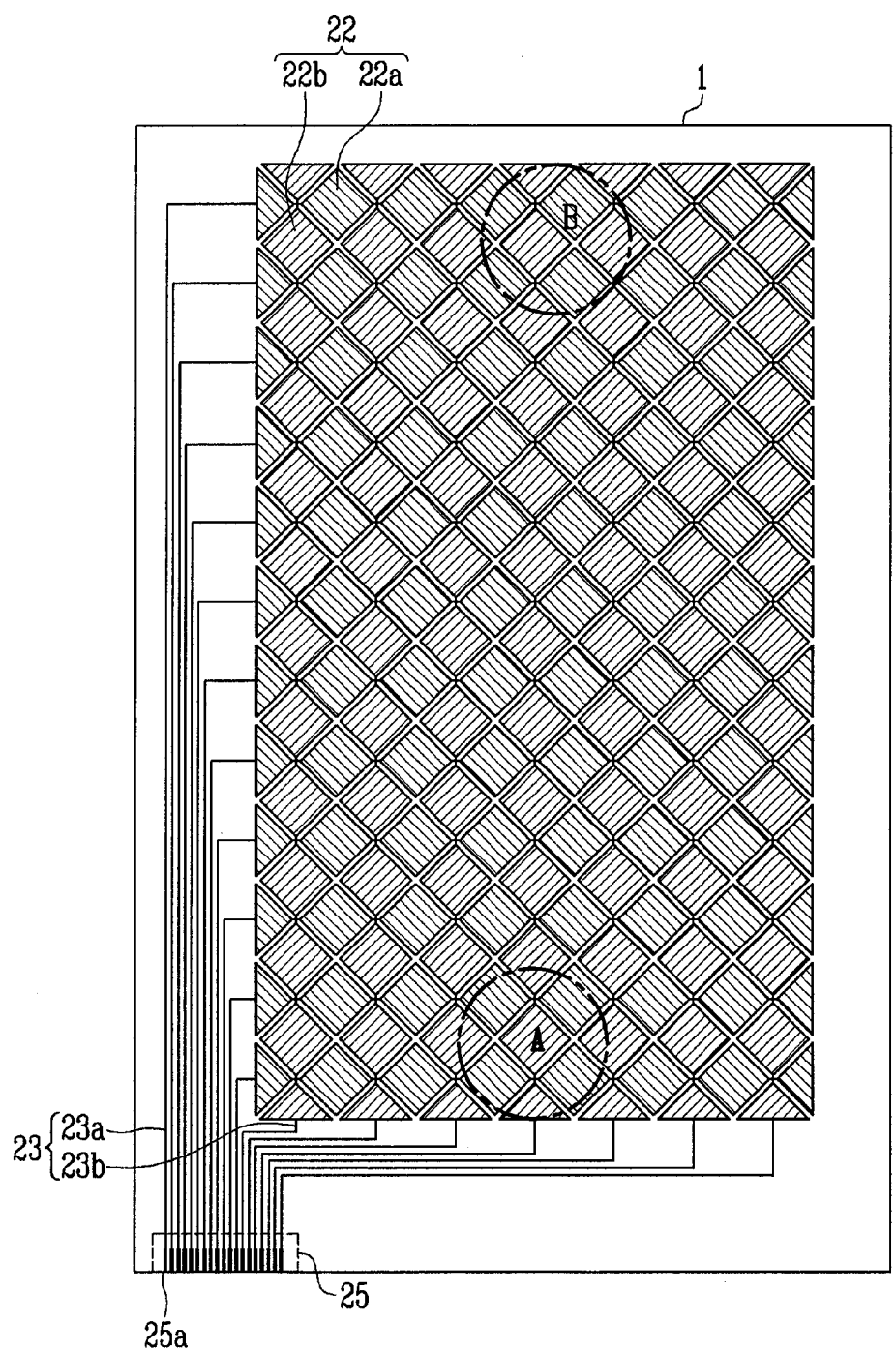
FIG. 1 is a plan view showing a touch screen panel according to the related art.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" or "coupled to" another element, it can be directly connected to the another element or be indirectly connected to the another element with one or more intervening elements interposed therebetween. Hereinafter, like reference numerals refer to like elements.

Hereinafter, exemplary embodiments of the present invention will be described in detail with reference to the accompanying drawings.

Figure 2:
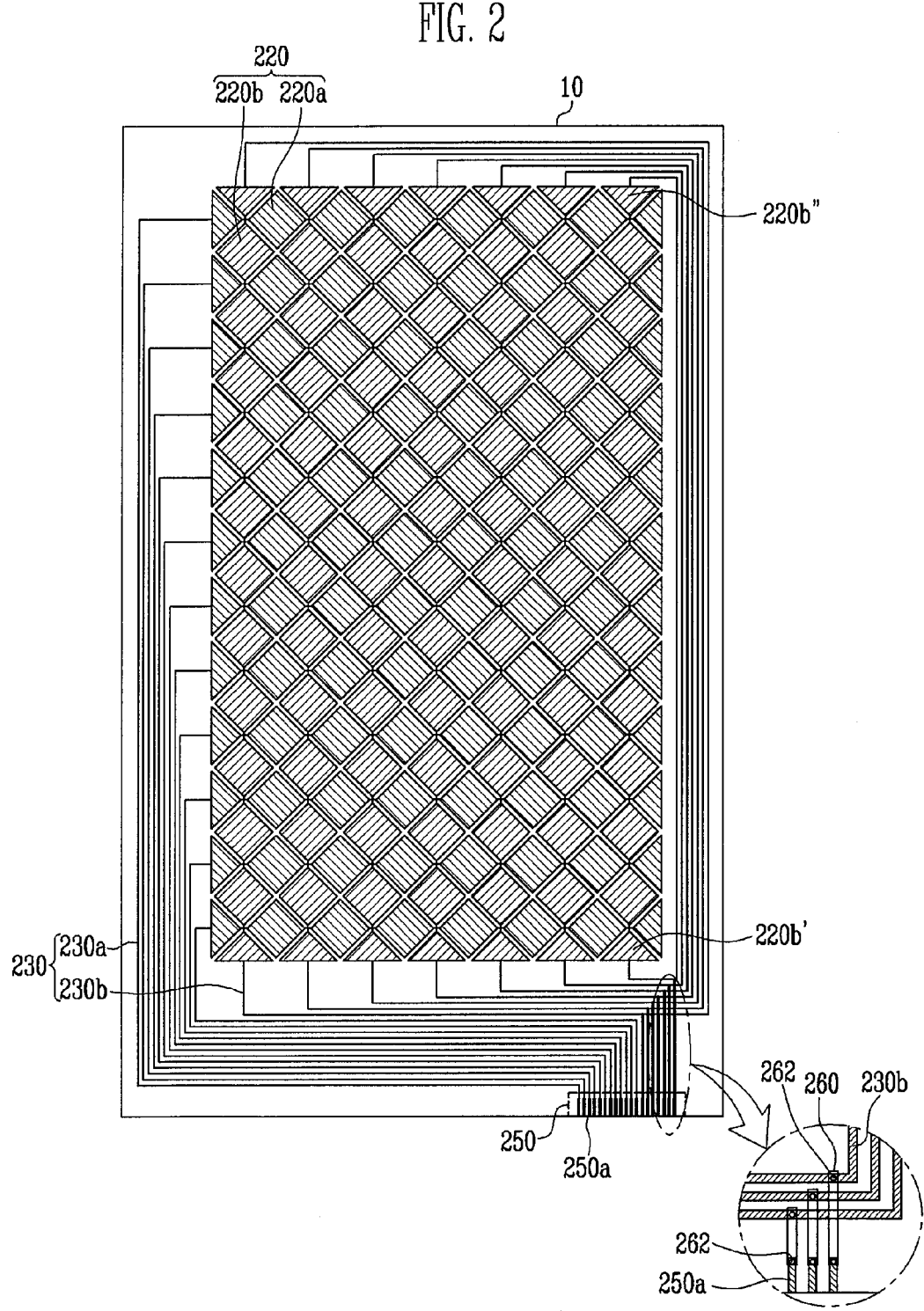
FIG. 2 is a plan view showing a touch screen panel according to an exemplary embodiment of the present invention.

FIG. 2 is a plan view schematically showing a touch screen panel according to an exemplary embodiment of the present invention.

Referring to FIG. 2, the touch screen panel according to the exemplary embodiment of the present invention is configured to include a transparent substrate 10, sensing patterns 220 formed on a display region of the transparent substrate 10, and sensing lines 230 formed on a non-display region positioned outside of the display region and connecting the sensing patterns 220 to an external driving circuit (not shown) through a pad part 250.

The sensing lines 230 include first sensing lines 230a each connected to corresponding first sensing cells 220a arranged in a first direction (for example, an X axis direction) among the sensing patterns 220, and second sensing lines 230b each connected to corresponding second sensing cells 220b arranged in a second direction (for example, a Y axis direction) among the sensing patterns 220 so as not to be overlapped with the first sensing cells 220a.

Here, the first and second sensing cells 220a and 220b may be made of a transparent conductive material (for example, ITO), and the first and second sensing lines 230a and 230b may be made of a metal material having low resistance.

According to the exemplary embodiment of the present invention, some sensing lines of the first and second sensing lines 230a and 230b are implemented in a double routing structure and the sensing lines implemented in the double routing structure are implemented in a structure in which they are electrically connected to the pads 250a of the pad part 250 through connection patterns 260.

Here, the double routing structure is different from a structure in which the sensing lines connected to the sensing cells arranged at the same column or row, are each connected to one sensing cell positioned at one distal end of the display region, such as a single routing structure according to the related art. The double routing structure is a structure in which the sensing lines connected to the sensing cells arranged at the same column or row, such as the second sensing lines 230b shown in FIG. 2, are each connected to two serially coupled sensing cells positioned at two distal ends of the display region.

That is, referring to the embodiment shown in FIG. 2, according to the exemplary embodiment of the present invention, the first sensing lines 230a are implemented in the single routing structure in which they are electrically connected to the first sensing cells 220a' positioned at a distal end of the left portion of the display region, respectively; however, the second sensing lines 230b are implemented in the double routing structure in which they are electrically connected to the second sensing cells 220b' and 220b" positioned at distal ends of upper and lower portions of the display region, respectively.

However, FIG. 2 is only an example, and the present invention is not necessarily limited thereto. That is, the first sensing lines 230a may be implemented in the double routing structure, or both of the first and second sensing lines 230a and 230b may be implemented in the double routing structure.

As described above, when the sensing lines are implemented in the double routing structure, the number of sensing lines in the double routing structure generally increases doubly. Therefore, the number of pads 250a of the pad part 250 connected to the sensing lines also increases by the increased number of sensing lines.

However, when the number of pads 250a increases, the entire area of the pad part 250 increases, which reduces a design margin of the pad part.

Therefore, according to the exemplary embodiment of the present invention, in order to implement the sensing lines in the double routing structure without increasing the number of pads 250a of the pad part 250, the second sensing line 230b connected to the second sensing cells 220b' and 220b" positioned at both distal ends of the display region among the second sensing cells 220b arranged in the same row, is implemented by one line, as shown in FIG. 2.

That is, the second sensing lines 230b are connected to the second sensing cells 220b of each of the rows in a form in which they each form a closed loop.

However, the second sensing lines 230b in the closed loop form are electrically connected to the pads 250a of the pad part 250 corresponding thereto, which are implemented through a plurality of connection patterns 260 corresponding to each of the second sensing lines 230b, as shown in FIG. 2.

Referring the FIG. 2, the second sensing lines 230b according to the exemplary embodiment of the present invention, which has the double routing structure, are implemented in a structure in which each of the second sensing lines 230b is connected to the corresponding second sensing cells 220b' and 220b" respectively positioned at both distal ends of the display region among the second sensing cells 220b arranged in each of the rows, in the closed loop form. The second sensing lines 230b in the closed loop form are electrically connected to the pads 250a of the pad part 250 corresponding thereto through the plurality of connection patterns 260.

In this configuration, the connection patterns 260 are positioned on a layer different from a layer on which the second sensing lines 230b are formed. For example, an insulation layer (not shown) is formed on the second sensing lines 230b, contact holes 262 are formed in the insulation layer at the regions overlapped with the second sensing lines 230b to be connected. The connection patterns 260 and the second sensing lines 230b corresponding thereto are electrically connected to each other through the contact holes 262.

In this case, the connection patterns 260 may be made of the same transparent conductive material as that of the first and second sensing cells 220a and 220b.

In addition, likewise, when the connection patterns 260 and pads 250a of the pad part 250 are electrically connected to each other, contact holes 262 are formed in the insulation layer at a region overlapped with the pads 250a to be connected, and the connection patterns 260 and the pads 250a corresponding thereto are electrically connected to each other through the contact holes 262.

The connection patterns 260 as described above are electrically connected to the pads 250a of the pad part 250 corresponding thereto without causing a short circuit between the second sensing lines 230b arranged in the closed loop form.

In addition, each of the second sensing lines 230b is connected to both distal ends of the corresponding second sensing cells 220b arranged in each of the rows in the closed loop form. The second sensing lines 230b are connected to the pads 250a through the connection pattern 260 corresponding thereto, respectively, thereby maintaining the number of pads 250a connected to the sensing lines 230b so as to be the same as that of the single routing structure according to the related art while implementing the second sensing lines 230b in the double routing structure.

Figure 3:
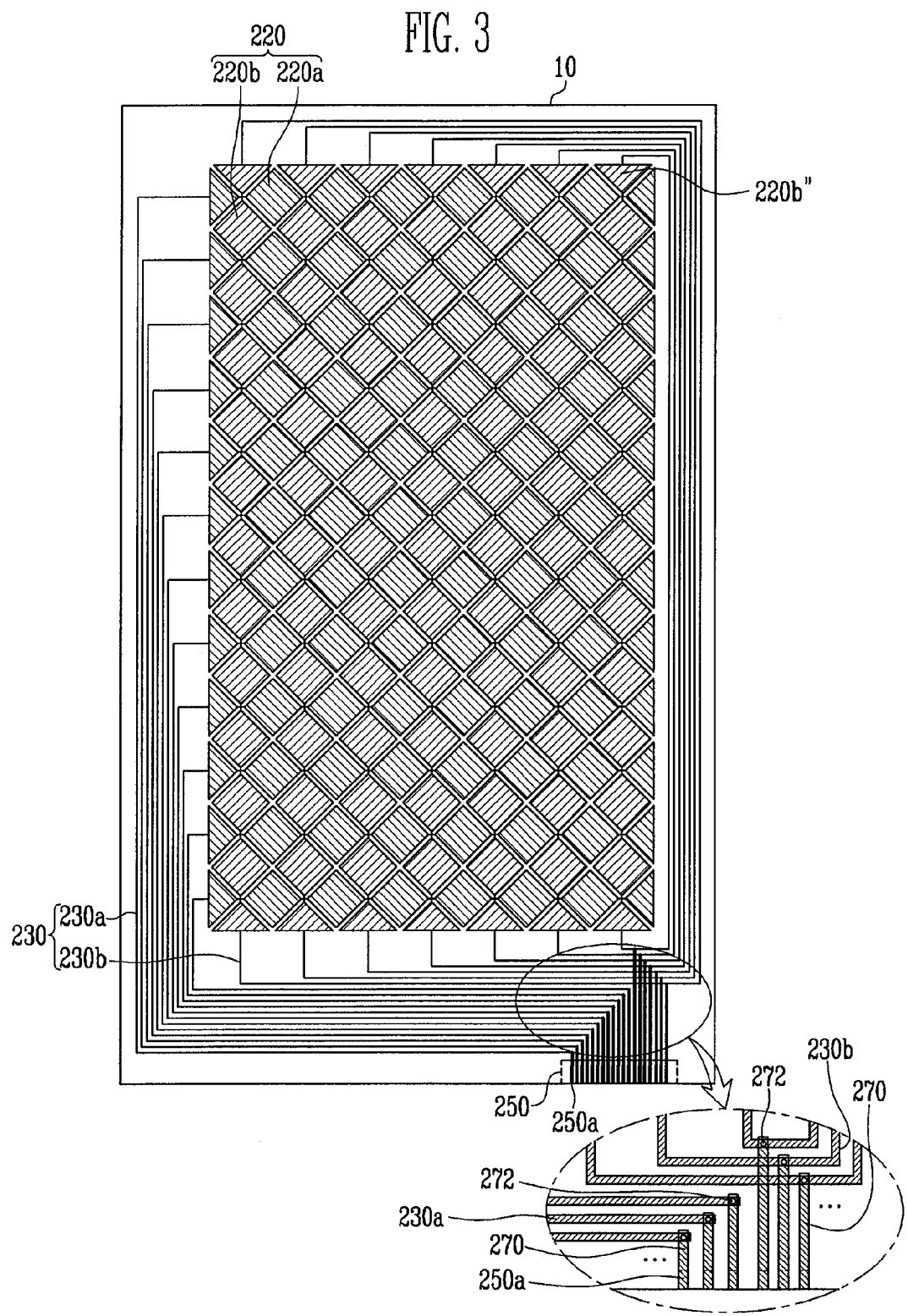
FIG. 3 is a plan view showing a touch screen panel according to another exemplary embodiment of the present invention.

FIG. 3 is a plan view schematically showing a touch screen panel according to another exemplary embodiment of the present invention.

The touch screen panel according to another exemplary embodiment of the present invention shown in FIG. 3 has substantially the same configuration as that of the touch screen panel shown in FIG. 2, except for a material and a connection relationship of connection patterns 270. Therefore, the same components will be denoted by the same reference numerals, and a detailed description thereof will be omitted.

Referring to FIG. 3, according to another exemplary embodiment of the present invention, the connection patterns 270 are positioned on a layer different from a layer on which the second sensing lines 230b are formed. For example, an insulation layer (not shown) is formed on the second sensing lines 230b. Contact holes 272 are formed in the insulation layer at a region overlapped with the second sensing lines 230b to be connected. The connection patterns 270 and the second sensing lines 230b corresponding to the connection patterns 270 are electrically connected to each other through the contact holes 272.

However, unlike the exemplary embodiment shown in FIG. 2, the connection patterns 270 may be electrically connected to the first sensing lines 230a as well as the second sensing lines 230b.

That is, as shown in FIG. 3, the contact holes 272 are formed in the insulation layer at the region overlapped with the distal ends of the respective first sensing lines 230a, and the connection patterns 270 and the first sensing lines 230a corresponding thereto are electrically connected to each other through the contact holes 272.

The connection patterns 270 are different from those of the exemplary embodiment of FIG. 2 in that they may not be made of the transparent conductive material, but may be integrally formed with the plurality of pads 250a of the pad part 250 and may be made of a metal material having low resistance.

That is, when the connection patterns 270 are formed integrally with the pads 250a, separate contact holes are not formed in order to connect the connection patterns 270 and the pads 250a to each other.

The connection patterns 270 and the pads 250a of the pad part 250 corresponding thereto are electrically connected to each other without causing a short circuit between the second sensing lines 230b arranged in the closed loop form by the connection patterns 270.

In addition, each of the second sensing lines 230b is connected to both distal ends of the corresponding second sensing cells 220b arranged in each of the rows in the closed loop form. The second sensing lines 230b having the double routing structure and the first sensing lines 230a having the single routing structure, are electrically connected to the pads 250a, respectively, by the connection patterns 270 connected integrally with the pads 250a, thereby making it possible to maintain the number of pads 250a connected to the sensing lines 230b so as to be the same as that of the single routing structure according to the related art while implementing second sensing lines 230b in the double routing structure.

Figure 4:
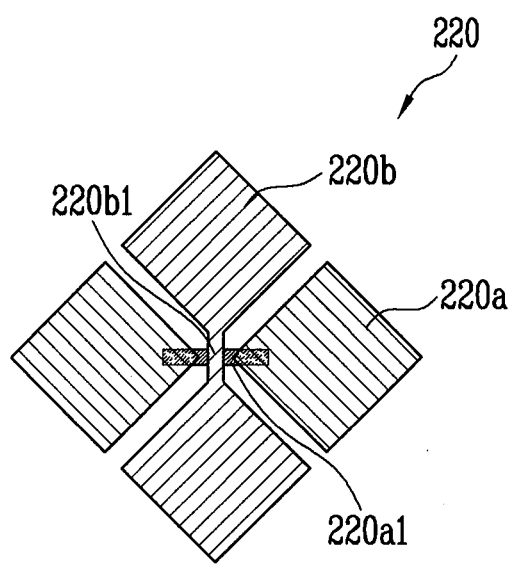
FIG. 4 is an enlarged view of main portions showing an example of sensing patterns shown in FIGS. 2 and 3.

FIG. 4 is an enlarged view of main portions showing an example of sensing patterns shown in FIGS. 2 and 3.

A configuration of the touch screen panel according to an exemplary embodiment of the present invention will be described with reference to FIG. 4.

As shown in FIG. 4, the sensing pattern 220 includes a plurality of first sensing cells 220a connected to each other in a row line in a first direction (for example, an X axis direction), a first connection line 220a1 connecting the first sensing cells 220a to each other in a row direction, a plurality of second sensing cells 220b connected to each other in a column in a second direction (for example, a Y axis direction), and a second connection line 220b1 connecting the second sensing cells 220b to each other in a column direction.

Although FIG. 4 shows only some of the sensing patterns for convenience, the touch screen panel according to the exemplary embodiment of the present invention has a structure in which the sensing patterns shown in FIG. 4 are repeatedly disposed.

The first and second sensing cells 220a and 220b are alternatively disposed so as not to be overlapped with each other, and the first and second connecting lines 220a1 and 220b1 cross each other. Here, an insulating layer (not shown) is interposed between the first and second connecting lines 220a1 and 220b1 in order to secure stability.

Meanwhile, the first and second sensing cells 220a and 220b may be formed integrally with the first and second connecting lines 220a1 and 220b1 using a transparent conductive material such as indium tin oxide (ITO), or be formed separately from the first and second connecting lines 220a1 and 220b1 and then electrically connected to the first and second connecting lines 220a1 and 220b1.

For example, the second sensing cells 220b may be patterned integrally with the second connection lines 220b1 in the column direction, and the first sensing cells 220a may be patterned between the second sensing cells 220b so as to each have an independent pattern and be connected to each other by the first connecting lines 220a1 that are positioned at an upper or lower portion thereof in the row direction.

Here, the first connecting lines 220a1 may directly contact the first sensing cells 220a on an upper or lower portion of the first sensing cells 220a to thereby be electrically connected thereto or be electrically connected to the first sensing cells 220a through contact holes, or the like.

The first connecting lines 220a1 may be made of a transparent conductive material such as ITO or be made of an opaque low resistance metal material, and have an adjusted width, or the like, in order to prevent visualization of the pattern.

In addition, the sensing lines 230 shown in FIGS. 1 and 2 are connected to the first sensing cells 220a in row units and the second sensing cells 220b in column units to connect the first and second cells 220a and 220b to the external driving circuit (not shown) such as a position detecting circuit through the pad part 250.

These sensing lines 230, which are disposed at the non-display area outside of the display area in which an image is displayed, may be made of a wide range of materials. In several embodiments, the sensing lines 230 may be made of a low resistance metal material such as molybdenum (Mo), silver (Ag), titanium (Ti), copper (Cu), aluminum (Al), molybdenum/aluminum/molybdenum (Mo/Al/Mo), and the like, in addition to the transparent conductive material used to form the sensing patterns 220.

The touch screen panel according to the exemplary embodiments of the present invention as described above is a capacitive type touch panel. When a contact object such as a human hand, a stylus pen, or the like, contacts the touch screen panel, a change in capacitance according to a contact position is transferred from the sensing patterns 220 to the driving circuit (not shown) via the sensing lines 230 and the pad part 250. In this case, the change in capacitance is converted into an electrical signal by X and Y input processing circuits, or the like (not shown), such that the contact position is recognized.

As set forth above, according to the exemplary embodiments of the present invention, some sensing lines of the first and second sensing lines are implemented in the double routing structure, and the sensing lines implemented in the double routing structure are electrically connected to the pads of the pad part through the connection patterns formed in other layers, thereby making it possible to implement the double routing structure without increasing the number of pads of the pad part.

In addition, the sensing lines are implemented in the double routing structure, thereby making it possible to minimize the deterioration of the sensing sensitivity, even in the touch screen panel having a large area.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel comprising:
   sensing patterns formed on a display region of a transparent substrate and comprising first sensing cells arranged in a first direction and second sensing cells arranged in a second direction so as not to be overlapped with the first sensing cells;
   first and second sensing lines formed in a non-display region of the transparent substrate outside of the display region, each of the first sensing lines being coupled to corresponding one or more of the first sensing cells and each of the second sensing lines being coupled to corresponding one or more of the second sensing cells; and
   a pad part comprising a plurality of pads coupled to the first and second sensing lines, respectively,
   wherein at least one of the first or second sensing lines are implemented in a double routing structure such that each of the first sensing lines and/or the second sensing lines is directly connected to two serially coupled first sensing cells and/or second sensing cells at opposite ends of the display region, and
   wherein the sensing lines implemented in the double routing structure are electrically coupled to the pads of the pad part through connection patterns, the connection patterns being on a different layer from that of which the sensing lines implemented in the double routing structure are located, and each of the connection patterns having one end connected to a corresponding sensing line that is connected to the two serially coupled sensing cells, and another end connected to the pad part.

2. The touch screen panel according to claim 1, wherein each of the sensing lines implemented in the double routing structure is coupled to the corresponding sensing cells arranged in the same column in the first direction or the same row in the second direction at two distal ends of the display region.

3. The touch screen panel according to claim 1, wherein the second sensing lines are implemented in the double routing structure.

4. The touch screen panel according to claim 3, wherein each of the second sensing lines coupled to sensing cells positioned at two distal ends of the display region among the second sensing cells arranged in the same row in the second direction, forms a closed loop with the sensing cells.

5. The touch screen panel according to claim 1, wherein the first and second sensing cells comprise a transparent conductive material.

6. The touch screen panel according to claim 1, wherein the first and second sensing lines comprise a metal material having low resistance.

7. The touch screen panel according to claim 1, wherein the connection patterns are formed on a layer different from a layer on which the first and second sensing lines are formed.

8. The touch screen panel according to claim 7, wherein the connection patterns comprise the same material as that of the first and second sensing cells.

9. The touch screen panel according to claim 8, wherein one side of the connection patterns is positioned on an insulation layer formed on the second sensing lines, and the connection patterns are electrically coupled to the second sensing lines through contact holes formed in the insulation layer at a region overlapped with the second sensing lines corresponding thereto.

10. The touch screen panel according to claim 9, wherein another side of the connection patterns is positioned on the insulation layer formed on the pads, and the connection patterns are electrically coupled to the pads through contact holes formed in the insulation layer of a region overlapped with the pads corresponding thereto.

11. The touch screen panel according to claim 7, wherein the connection patterns are integrally formed with the plurality of pads of the pad part.

12. The touch screen panel according to claim 11, wherein one side of the connection patterns is positioned on an insulation layer formed on the first and second sensing lines, and the connection patterns are electrically coupled to the first and second sensing lines through contact holes formed in the insulation layer of a region overlapped with the first and second sensing lines corresponding thereto, respectively.

13. The touch screen panel according to claim 1, wherein the sensing patterns further comprise:
   first connection lines, each of the first connection lines coupling the first sensing cells adjacent to each other in the first direction to each other; and
   second connection lines, each of the second connection lines coupling the second sensing cells adjacent to each other in the second direction to each other.

14. The touch screen panel according to claim 13, wherein an insulation layer is interposed at a crossing portion between the first and second connection lines.

\* \* \* \* \*